(12) United States Patent
Agarwal et al.

(10) Patent No.: US 8,239,458 B2
(45) Date of Patent: Aug. 7, 2012

(54) DETERMINING FAILED DELIVERY OF EMAIL MESSAGES USING EMAIL NOTIFICATIONS

(75) Inventors: Sharad Agarwal, Seattle, WA (US); Venkata N. Padmanabhan, Sammamish, WA (US); Joseph Dilip Antony, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 1231 days.

(21) Appl. No.: 11/395,435

(22) Filed: Mar. 31, 2006

(65) Prior Publication Data

US 2007/0233790 A1    Oct. 4, 2007

(51) Int. Cl.
G06F 15/16    (2006.01)
(52) U.S. Cl. .......................................... 709/206
(58) Field of Classification Search .............. 709/206, 709/230
See application file for complete search history.

(56) References Cited

U.S. PATENT DOCUMENTS

| | | | | |
|---|---|---|---|---|
| 6,609,156 | B1 * | 8/2003 | Magolan et al. | 709/232 |
| 7,272,662 | B2 * | 9/2007 | Chesnais et al. | 709/246 |
| 7,788,325 | B1 * | 8/2010 | Glidden et al. | 709/206 |
| 7,865,559 | B1 * | 1/2011 | Day | 709/206 |
| 7,970,834 | B2 * | 6/2011 | Daniels et al. | 709/206 |
| 2002/0042830 | A1 * | 4/2002 | Bose et al. | 709/230 |
| 2002/0144148 | A1 | 10/2002 | Hashem et al. | |
| 2002/0144154 | A1 | 10/2002 | Tomkow | |
| 2003/0110224 | A1 * | 6/2003 | Cazier et al. | 709/206 |
| 2004/0025057 | A1 * | 2/2004 | Cook | 713/201 |
| 2004/0240462 | A1 * | 12/2004 | T V et al. | 370/432 |
| 2005/0222969 | A1 | 10/2005 | Yip et al. | |
| 2005/0289221 | A1 * | 12/2005 | Steele | 709/206 |
| 2007/0067399 | A1 | 3/2007 | Kulkarni et al. | |
| 2007/0233789 | A1 | 10/2007 | Agarwal et al. | |
| 2008/0313296 | A1 | 12/2008 | Muller | |

OTHER PUBLICATIONS

Afergan and R. Beverly. The State of the Email Address. *ACM CCR*, Jan. 2005.
AOL Member Missing Email Self Help Page. http://postmaster.info.aol.com/selfhelp/mbrmissing.html.
Cabrera, M. Jones, and M. Theimer. Herald: Achieving a Global Event Notification Service. *HotOS*, May 2001.
ePOST Serverless Email System. http://www.epostmail.org/.
Fajman. An Extensible Message Format for Message Disposition Notifications. *RFC 2298, IETF*, Mar. 1998.
Freedman, E. Freudenthal, and D. Mazieres. Democratizing Content Publication with Coral. *NSDI*, Mar. 2004.
Lang. Email Dependability. Bachelor of Engineering Thesis, The University of New South Wales, Australia, Nov. 2004. http://uluru.ee.unsw.edu.au/_tim/dependable email/thesis.pdf.

(Continued)

*Primary Examiner* — Brian P Whipple

(57) ABSTRACT

Notifying a user that an email message sent to the user was not received by the user. Users can register to receive notifications. When a sender sends an email message to a recipient, a separate notification also may be sent to a notification service that populates and controls access to an email notification list. Each notification in the list may comprise a hash of the content of the email message that it represents. A recipient module may be configured to check the notification list periodically and/or in response to a recipient's instructions, and compare notifications to the email messages received for the recipient to determine whether any email messages intended for the recipient were not received. If it is determined from the notifications that an email message was not received, a notice may be sent to the sender, which my include a request that the sender re-send the email message.

14 Claims, 4 Drawing Sheets

OTHER PUBLICATIONS

Mislove, A. Post, C. Reis, P. Willmann, P. Druschel, D. Wallach, X. Bonnaire, P. Sens, and J. Busca. POST: A Secure, Resilient, Cooperative Messaging System. *HotOS*, May 2003.

Moors. Email Dependability. *Email Management World*, Aug. 2004. http://uluru.ee.unsw.edu.au/_tim/dependable/email/emw moors.

Pivotal Veracity: Tools & Intelligence for Optimizing Delivery. http://www.pivotalveracity.com/.

Reiter and A. D. Rubin. Crowds: anonymity for Web transactions. *ACM Trans. on Information and System Security*, 1(1):66-92, 1998.

Rhea, B. Godfrey, B. Karp, J. Kubiatowicz, S. Ratnasamy, S. Shenker, I. Stoica, and H. Yu. OpenDHT: A Public DHT Service and its Uses. *SIGCOMM*, Aug. 2005.

Saltzer, D. Reed, and D. Clark. End-To-End Arguments in System Design. *ACM Transactions on Computer Systems*, 2(4), Nov. 1984.

"AOL Member Missing Email Self Help Page"; http://postmaster.info.aol.com/selfhelp/mbrmissing.html; retrieved Jan. 6, 2006; 1 page.

"ePOST Serverless Email System"; http://www.epostmail.org/; retrieved Jan. 6, 2006; 3 pages.

"Pivotal Veracity: Tools & Intelligence for Optimizing Delivery"; http://www.pivotalveracity.com; retrieved Jan. 6, 2006; 3 pages.

\* cited by examiner

DETERMINING FAILED DELIVERY OF EMAIL MESSAGES USING EMAIL NOTIFICATIONS

BACKGROUND

Email systems based on the Simple Mail Transfer Protocol (SMTP) such as, for example, the SMTP-based email system used by the Internet, typically do not guarantee the timely or even eventual delivery of messages. Email messages can sometimes be delayed by hours or days, or even fail to be delivered at all to the recipient(s), and the message sender isn't always notified when such failures occur. Such silent failures, even if rare, impose a high cost on users in terms of missed opportunities, lost productivity, or needless misunderstanding (notwithstanding the purported social "benefit" of plausible deniability offered by email message loss).

An email message could be delayed or lost because of overload, failure (e.g., disk crash), or upgrade of a server along the end-to-end, store-and-forward path from the sender to the recipient. Overload or failure is sometimes triggered by a spurt in the volume of email messages because of spam or the spread of a virus. Furthermore, the widespread use of spam filters also contributes to email message loss by sometimes causing legitimate email messages to be discarded as spam.

Even though SMTP allows servers that cannot deliver email messages to auto-generate non-delivery messages to the sender, four issues have reduced the effectiveness of such messages. First, email messages dropped by spam filters typically do not cause such messages to be generated. Second, spam sent using spoofed source email addresses can generate bogus non-delivery messages to the spoofed source, which can lead to general apathy toward such messages, or worse, classification of such messages as spam. Third, some corporations do not allow such messages to be generated to protect the privacy of the corporation (e.g., it prevents an entity from verifying if an email address is invalid). Fourth, such responses do not consider email messages that are lost between the destination email server and the intended recipient's email client. Thus email message loss is often silent, such that neither the sender nor the recipient is notified of the delivery failure.

Recent studies have quantified the extent of silent email message loss. One report on the state of email health on the Internet used bounced-back email messages as a measurement tool. Based on a study of 1468 email servers across 571 domains, significant instances of silent email message loss were found. For instance, 60 out of the 1468 servers exhibited a silent email message loss rate of over 5%, with several others exhibiting a more modest but still non-negligible loss rate of 0.1-5%. The study also found instances of email messages delayed by more than a day, which might not be much better than email message loss from a user's viewpoint. One caveat with this study, however, is that bounced-back email messages might not reflect the true health of the email system for normal email messages.

Other studies have used a more direct methodology to measure email message delays and loss. These studies obtained 40 email accounts across 16 domains and made direct measurements by repeatedly sending email messages to these accounts (over 6000 email messages to each account over a 3-month period). These studies report an overall silent email loss rate of 0.69%, with the loss rate being over 4% in some cases. While this study avoids dependence on bounced-back email messages, there are other biases it may suffer from, including the use of a single sender for all email messages. Further, the inventors conducted a three-month long measurement experiment aimed at avoiding the shortcomings of earlier studies. This experiment found a non-negligible silent email message loss rate of 0.71-0.91%.

Besides these measurement studies, anecdotal evidence suggests that email message loss is a non-negligible problem. For instance, consumer Internet Service Providers (ISPs) take the trouble to instruct users on what to do when an email message goes missing, and there are companies that offer email monitoring services for businesses concerned about email message loss.

There have been various proposals to address the email unreliability problem, ranging from simple augmentation of the current email system to radical redesign. In the former category is the message disposition notification mechanism (i.e. "read receipts"), which allows a sender to request that the recipient (or his/her user agent) generate an acknowledgment when an email has been read. While many email clients (e.g., Microsoft® Outlook®) support read receipts, anecdotal evidence suggests that most users do not enable this feature because it exposes too much private information, e.g., how often a user reads email messages, and whether and when the user read a particular email message. Users may find that this exposure conflicts with the inherent "asynchronous" use of email. More importantly, such read receipts—whether sent explicitly through the email system or implicitly through accesses to embedded web content—tell spammers whether an email account is active, thereby making their spamming more "effective".

There have also been proposals to re-architect email servers or the email delivery architecture itself to improve its reliability. In particular, the POST email system proposes a server-less architecture based on a distributed overlay network consisting of the participants' desktop computers. While improving the reliability and availability of email systems is certainly desirable, such improvements alone will not solve the email message loss problem because of spam and the resulting filtering of email messages. To address the spam problem as well as to maintain the privacy of email message content, POST assumes a public key infrastructure (PKI) for users, which could be an impediment for deployment. Finally, since POST replaces the current email delivery infrastructure with a new peer-to-peer (P2P) overlay system, it raises uncertainties and risks with regard to its performance if all email systems were to switch over to the new system.

SUMMARY

This Summary provides an illustrative context for aspects of the invention, in a simplified form. It is not intended to be used to determine the scope of the claimed subject matter. Aspects of the invention are described more fully below in the Detailed Description.

Described herein are systems and methods for notifying a user of an email application that an email message sent to the user was not received by the user (i.e., by the email application on the user's device). Such a notification system may be integrated as part of an email system or may be implemented independent thereof. Users of such a notification system can register to receive notifications, for example, with a registration server of the notification system. When a sender sends an email message to a recipient, a separate notification also may be sent to a notification service that populates and controls access to an email notification list (e.g., stored using a table or other data structure). If an email message is addressed to multiple recipients, a separate notification may be sent to the notification service for each recipient, and stored in the notification list.

The notification service may be implemented in a centralized fashion or in a more distributed manner, and may use dedicated servers and/or user devices. For example, the notification service may be implemented using: a centralized service for all users of a system; a notification service for each email domain of a network; a distributed hash table (DHT) maintained by a third party; a DHT maintained cooperatively by a set of email domains; a DHT maintained cooperatively by a set of users of a notification system (e.g., using a notification client on each user device); a private notification service within each email domain of a network that only provides notification service for emails sent by senders in the email domain for recipients in the email domain; and any suitable combination of the foregoing.

Each notification may be stored, for example, in a DHT indexed by an email identifier of the intended recipient. Each notification may comprise a hash of the content of the email message that it represents. Each notification may be indexed using a key derived from an identity of the intended recipient; i.e., derived from the intended recipient's email address. Each notification may include other information elements as well, such as, for example, an authenticator to verify the identity of the sender, an identity of the recipient suitably obfuscated (e.g., using encryption or cryptographically secure one-way hashing) and a time-to-live for the notification.

The notification list may be checked (e.g., queried) periodically and/or in response to the recipient's instructions, for example, by a recipient module on the recipient's device. For example, a request may be sent to the notification service that requests notifications for the recipient, and the request may include credentials of the recipient. The request may be authenticated (e.g., by the notification service and/or a separate registration server) based on the credentials. If the request is authentic, the recipient's notifications may be retrieved from the notification list and provided to the recipient (e.g., a recipient module of the recipient's device).

The notification retrieval process may include determining whether there have been any changes since a last time notifications were requested by (and/or retrieved for) the recipient. If there are changes (i.e., one or more new notifications have been posted), the new notification(s) may be compared to the email messages received by the recipient to determine whether any email messages intended for the recipient were not received. For each notification, an email hash included in the notification may be compared to a hash of each email message received by a recipient (e.g., since a certain date and/or time such as, for example, the earliest date and/or time specified in a last batch of notifications retrieved). The hash of each email message received by the recipient may be computed at the time (approximately) of performing the comparison(s) or before the notification(s) are requested or received, for example, periodically, or in response to a user request, or each time an email message is received.

If it is determined from the notifications that an email message was not received, a notice may be sent to the sender, which my include a request for the sender to re-send the email message. In some embodiments, the recipient may control whether such a notice is sent to the sender.

The registration server may be integrated with the notification service or may be implemented as a separate and discrete component of a notification system. Further, the registration server and/or the notification service may be integrated with an email server as part of an email system or may be implemented as part of a separate and discrete notification system.

In some embodiments, notifications are not transmitted separately from email messages, but are included in the email messages themselves. For example, notifications for one or more email messages (e.g., the last n emails) previously sent from a sender to a recipient may be contained within an email currently be transmitted from the sender to the recipient. In such embodiments, the notifications are not stored separately, but rather in the email messages themselves, such that a notification service and notification list may not be necessary, and thus may not provided.

Various cryptographic techniques and other security may be employed in registering recipients, posting notifications and/or retrieving notifications for recipients. In some embodiments, a Public Key Infrastructure (PKI) may be used, and, in other embodiments, non-PKI encryption and authentication techniques may be employed. Some non-PKI techniques may involve using one or more email messages previously exchanged between a sender and a recipient as one or more shared secrets between the sender and recipient. These one or more shared secrets may yield cryptographic keys for notifications for email messages sent from the sender to the recipient.

In some embodiments of the invention, a notification system is overlaid on an unmodified SMTP email delivery system, thereby enabling intended email recipients to determine when they are missing email. Such embodiments may augment existing email systems, which work most of the time, rather than replacing such email systems with a new system of uncertain reliability. Placing the onus of detecting missing email messages on intended recipients preserves the asynchronous operation of an email system and the privacy that email systems typically provide with respect to user behavior (e.g., when a user sends email or checks for received emails). Further, such embodiments may operate without requiring a PKI for email users. Keeping aspects of such a notification system separate from the email system for which the notification system is employed ensures that, even in a worse case scenario, email performance is no worse than it would be without the notification system.

In an embodiment of the invention, it is ascertained whether an electronic mail application on a user device has not received an electronic mail message sent to a user of the user device. A notification list is accessed, which includes at least one notification indicative of a first electronic mail message sent to the user. It is determined whether the first electronic mail message indicated by the at least one notification has not been received by the electronic mail application.

In another embodiment, a system is provided for ascertaining whether an electronic mail application on a user device has not received an electronic mail message sent to a user of the user device. A module is operative to access a notification list, which includes at least one notification indicative of a first electronic mail message sent to the user. A module is operative to determine whether the first electronic mail message indicated by the at least one notification has not been received by the electronic mail application.

In another embodiment, a computer-readable medium is provided, the computer-readable medium has computer-readable signals stored thereon that define instructions that, as a result of being executed by a computer, control the computer to perform a method of ascertaining whether an electronic mail application on a user device has not received an electronic mail message sent to a user of the user device. The method comprising acts of: (A) accessing a notification list including at least one notification indicative of a first electronic mail message sent to the user; and (B) determining whether the first electronic mail message indicated by the at least one notification has not been received by the electronic mail application.

In yet another embodiment, a system is provided for controlling access to a notification list including a plurality of notifications for a plurality of users, each notification indicative of an electronic mail message sent to a particular user. The system comprises a notification service operative to receive a request for notifications for a first user, and operative to determine one or more notifications in the list that correspond to the first user.

In another embodiment, access to a notification list including a plurality of notifications for a plurality of users is controlled, each notification indicative of an electronic mail message sent to a particular user. A request for notifications for a first user is received, and one or more notifications in the list that correspond to the first user is determined.

In another embodiment, a computer-readable medium is provided. The computer-readable medium has computer-readable signals stored thereon that define instructions that, as a result of being executed by a computer, control the computer to perform a method of controlling access to a notification list including a plurality of notifications for a plurality of users, each notification indicative of an electronic mail message sent to a particular user. The method comprises acts of: (a) receiving a request for notifications for a first user; and (B) determining one or more notifications in the list that correspond to the first user.

In another embodiment, access to a notification list including a plurality of notifications for a plurality of users is controlled, each notification indicative of an electronic mail message sent to a particular user. A request for notifications for a first user is received, and one or more notifications in the list that correspond to the first user is determined.

In yet another embodiment, an electronic mail message is communicated on a communications network. An electronic mail message is sent to at least one user, and at least one notification is sent in a communication separate from the electronic mail message, the at least one notification indicating that the electronic mail message was sent.

In another embodiment, a system is provided for communicating an electronic mail message on a communications network. A module is operative to send an electronic mail message to at least one user, and a module is operative to send at least one notification in a communication separate from the electronic mail message, the at least one notification indicating that the electronic mail message was sent.

In another embodiment, a computer-readable medium is provided. The computer-readable medium has computer-readable signals stored thereon that define instructions that, as a result of being executed by a computer, control the computer to perform a method of communicating an electronic mail message on a communications network. The method comprises acts of: (A) sending an electronic mail message to at least one user; and (B) sending, in a communication separate from the electronic mail message, at least one notification indicating that the electronic mail message was sent.

In yet another embodiment of the invention, a computer-readable medium is provided. The computer-readable medium has computer-readable signals stored thereon that define a data structure comprising at least one entry specifying a notification that an electronic email message was sent to a recipient. The data structure is operative to be accessed to determine that the electronic mail message was sent to the recipient.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Figure 1:
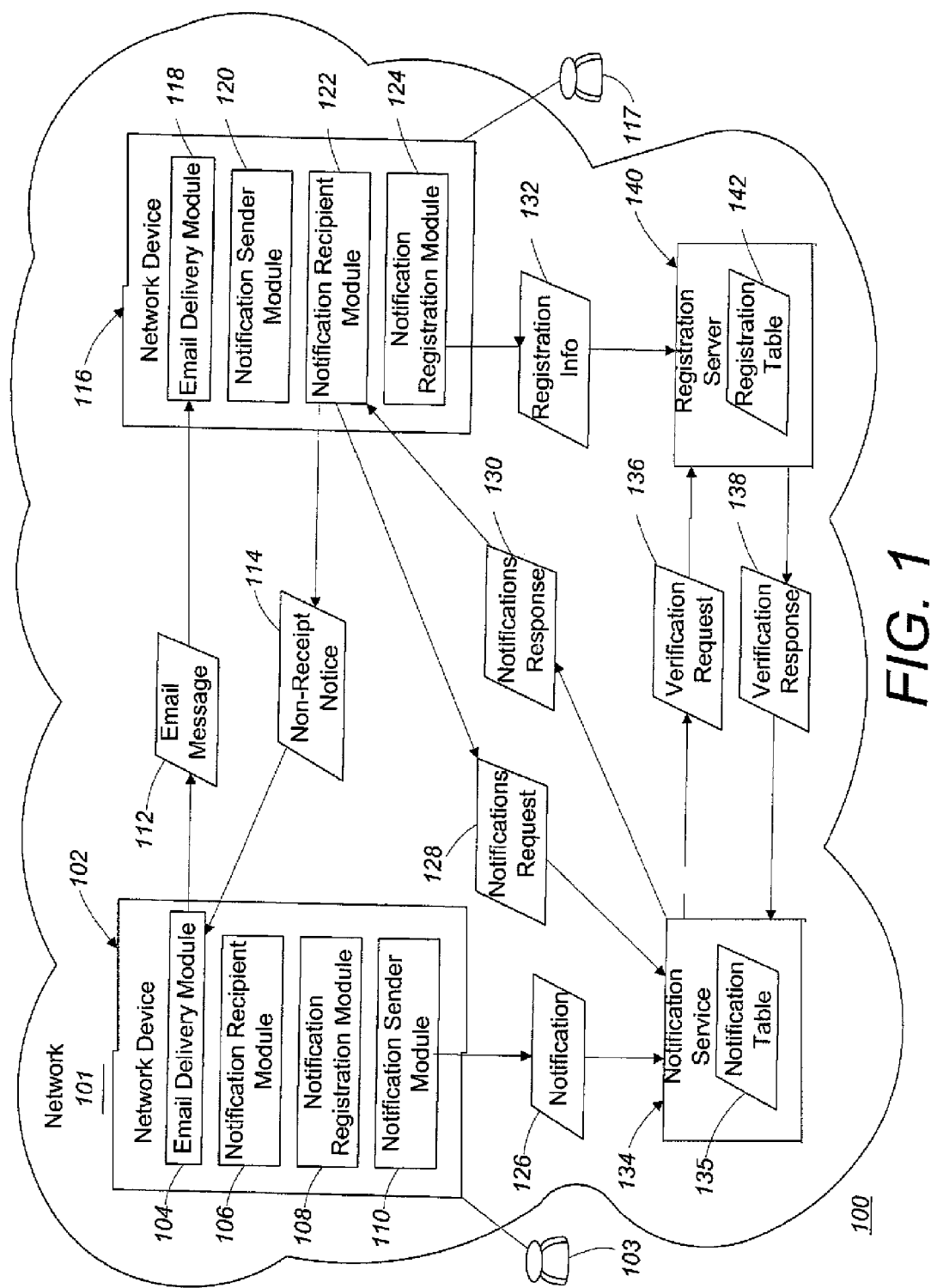
FIG. 1 is a block diagram illustrating an example of an email notification system, according to some embodiments of the invention.

In some embodiments of the invention, an existing e-mail system continues to be employed for message delivery, augmented with an email notification system that is, for example, overlaid on the email system. The notification system may enable a recipient to determine if the recipient did not receive any email messages sent to the recipient. It should be appreciated that the term "recipient" is often used herein to describe a user of an email system that is an intended recipient of an email message, regardless of whether the user actually receives the email message. Depending on a recipient's policy and/or an identity of a sender, a recipient may be enabled to request the sender (e.g., via email or out-of-band) to resend lost information/email messages. Thus, in some embodiments, senders are assured that either an email is delivered or the intended recipient discovers that it is missing (i.e., sent but not received).

In some embodiments of the invention, subversion of an email notification system by bogus notifications generated by spammers or malicious notification services is prevented. In such embodiments, a public key infrastructure (PKI) may be made available to all email users. Alternatively, or in addition to making PKI available, shared secrets may be established between senders and recipients without using PKI. For example, one or more email messages previously exchanged between a sender and recipient may serve as one or more shared secrets between the sender and recipient. Although using previously exchanged email messages as shared secrets is described herein primarily in relation to an email notification system, it should be appreciated that the invention is not so limited. Embodiments of the invention use one or more emails previously exchanged between users as one or more shared secrets between the users for applications other than an email system and/or email notification system.

As will become more clear from the following description, in some embodiments of the invention, an email notification system (e.g., system 100) is provided that exhibits one or more of the following desirable properties: causes minimal disruptions; places minimal demands on the user; preserves asynchronous operation; preserves privacy; maintains defense against spam and viruses; and minimizes overhead. Each of these properties will now be described in more detail.

Cause minimal disruption. In some embodiments of the invention, an email notification system may work for a majority of email messages. So rather than replace an existing email system with a new system of uncertain reliability, the existing email system may be augmented to improve its reliability. System 100 may inter-operate seamlessly with an existing email infrastructure (i.e., unmodified servers, mail relays, etc.), with additions restricted to software running on end-hosts (e.g., network devices 102 and 116). Such seamless integration also may ease the deployment of system 100.

Place minimal demands on the user. In some embodiments of the invention, an email notification system may be configured to minimize demands placed on a user's time. Ideally, user interaction should be limited only to actual instances of email message loss; otherwise, the user should not be involved any more than he/she would be in an email system that does not use email notifications.

Preserve asynchronous operation. In some embodiments of the invention, an email notification system may be configured to provide a loose coupling between senders and recipients, so that a sender does not know whether or when an email message was downloaded or read by the recipient, and potential recipients do not know whether a sender is "online", i.e., actively sending email messages to others. System 100 may be configured to preserve such asynchronous operation, which is in contrast to other forms of communication such as telephony, instant messaging and the use of "read receipts" for email.

Preserve privacy. In some embodiments of the invention, an email notification system may be configured to not reveal any more about a user's email communication behavior than an email system would without it. For instance, an email notification system may be configured so it is not possible for someone to determine: the number of email messages sent/received by another user; the recipients/senders of those email messages; how often the user checks email; and so on.

Preserve repudiability. In some embodiments of the invention, repudiability is preserved for a sender of an email. Repudiability is the ability of a sender to deny having authored an email, and is often considered a key element of email and other forms of casual communication such as instant messaging. It should be appreciated that there is a difference between repudiability and forgeability, which is the ability of an attacker to send email purporting to be from a particular sender. The former is desirable while the latter is not. PKI-based authentication of email users (described below), or even authentication based on a decentralized approach like PGP, may be unsuitable from the viewpoint of providing repudiability.

Maintain defenses against spam and viruses. In some embodiments of the invention, an email notification system may be configured so that is not any easier for spam and email viruses to circumvent the defenses that are in place than if the email notification system were not present. All email messages could continue to be routed through spam filters, so that spam does not unnecessarily impose on the user's time. It should not be any easier than in known email systems for spammers to determine whether an email address is valid or to circumvent spam defenses by forging the sender address.

Minimize overhead. In some embodiments of the invention, an email notification system may be configured to minimize the amount of overhead imposed, in terms of additional traffic and messaging. In particular, an email notification system may be configured to avoid duplicating the work done by the current email system on the data path, i.e., in conveying the message bits from the sender to the recipient.

Repudiability

Although several embodiments of the invention are described primarily in relation to determining for a user that one or more email messages sent to the user were not received by the user, it should be appreciated that the invention is not limited to email. Embodiments of the invention may include notifying a user that other types of information and/or communications (e.g., a file, an application, another type of message, results of a query, etc.) sent to the user were not received by the user.

The function and advantage of these and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

FIG. 1 is a block diagram illustrating an example of an email notification system 100 in accordance with some embodiments of the invention. System 100 is merely an illustrative embodiment of an email notification system, and is not intended to limit the scope of the invention. Any of numerous other implementations of an email notification system, for example, variations of system 100, are possible and are intended to fall within the scope of the invention.

System 100 may include any of: a plurality of user devices, including user devices (e.g., 102 and 116); notification service 134; registration server 140; other components; and any suitable combination of the foregoing. One or more of these device may be part of network 101.

As used herein, a "network" is a group of two or more components interconnected by one or more segments of transmission media over which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segment. Further, it should be appreciated that when a network is illustrated in a drawing of this application as being connected to an element in the drawing, the connected element itself is considered part of the network.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, repeaters, and any combinations thereof. As used herein, a "user device" is a network device from/to which a user may send/receive communications, and which may serve as an endpoint to communications on a communications network. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), two-way radios (e.g., "walkie-talkies"), other types of user devices, and any suitable combination of the foregoing.

A network (e.g., network 102) may be or include any of a variety of types of networks including, but not limited to, a local area network (LAN), a metropolitan area network (MAN), a wide-area network (WAN), a wireless network, a Public Land Mobile Network (PLMN), a Global System for Mobile Communications (GSM) network, a General Packet Radio Service (GPRS) network, a Universal Mobile Telecommunications System (UMTS) network, a Code-Division Multiple Access (CDMA) network, an optical network, a data network, an enterprise-wide network, a wireless personal area network (PAN), a home network, a telecommunications network, a public switched telephone network (PSTN), a broadband network, another type of network, or any suitable combination of the foregoing.

Network device 102 and network device 116 may include any of: email delivery modules 104 and 118, respectively; notification recipient modules 106 and 122, respectively; notification registration modules 108 and 124, respectively; notification sender modules 110 and 120, respectively; other components; and any suitable combination of the foregoing. Both network devices 102 and 116 may be configured to send and receive email messages using an email delivery module (e.g., 104 and 118). A notification recipient module, notification registration module and a notification sender module collectively may be referred to herein as "email notification components". On each network device, the email delivery module and/or one or more of the email notification components may be integrated, and one or more of the email notification components may be part of a separate, discrete module from the email delivery module. In the following examples, network device 116 serves as the recipient device and network device 102 serves as the sender device, although it should be appreciated that either device can serve as a recipient device or sender device.

Notification registration module 124 may be configured to register recipient 117 to receive notifications sent from other users of system 100, for example, by providing registration information 132 to registration server 140. Registration information may include any of a variety of information, including information that identifies recipient 117. For example, as will be described in more detail below, registration information 132 may include a hash of an identifier of recipient 117 and a signature of recipient 117 (e.g., generated using a private key of the recipient).

Registration server 140 may include and/or have access to a registration table 142 or other data structure that lists registrations of recipients to receive email notifications. Registration server 140 may verify the identity of recipient 117 using information (e.g., the signature) included in the registration information 132 and/or a public key of recipient 117, for example, using PKI or another cryptographic technique. If recipient 117 is verified, then an entry is placed in the registration table 142 using the registration information 132, and, as a result, registration server will receive and record notifications of email messages sent to the recipient. However, as will be described in more detail below, only recipient 117 (or more precisely, email notification components of network device 116) may have knowledge of the credentials necessary to read notifications for recipient 117.

Sender 103 may send an email message 112 (using email delivery module 104) to recipient 117 (i.e., to email delivery module 118). In conjunction with sending email message 112, notification sender module 110 may send a notification 126 to notification service 134. Notification service 134 may include a notification table 135 (e.g., a DHT) or other data structure that includes a list of notifications. It should be appreciated that, if an email message is addressed to multiple recipients, a separate notification may be sent to the notification service 134 for each recipient, and stored in the notification table 135.

In embodiments in which one or more DHTs are employed, notification service 134 may be configured to support standard put( ) and get( ) operations for storing/retrieving (key, value) pairs. For example, in some embodiments, notification service 134 may be configured to leverage one or more known DHT systems such as, for example, OpenDHT. While the scalability and availability of DHTs may be attractive for implementing notification service 134, other embodiments may be employed. For example, system 100 may include one or more non-DHT servers, which may be dedicated to receiving notifications for recipients. These servers may be advertised through a Domain Name Service (DNS).

Notification 126 may include any of a variety of information including, but not limited to, a hash of email message 112, a time-to-live value specifying the duration of the life of the notification, a suitably-obfuscated identity of the recipient 117 (e.g., encrypted using a public key of the recipient and identification of the sender 103), a signature of the sender (e.g., generated using a private key of the sender, a hash of the email message and a time-to-live value); a time stamp; other information; and any suitable combination of the foregoing. Each notification stored in notification table 135 may include at least similar units of information for other email messages sent to recipient 117 or other recipients. Further, each notification may be indexed using an identifier of a recipient (more precisely, an intended recipient) of the email message corresponding to the notification, for example, a suitably-obfuscated identity of the recipient. Further, one or more indexes of information stored in the notification table 135 may be stored on notification service 134 and/or within an information source accessible by notification service 134.

A sender may send a notification to notification service 134 for a recipient that is not registered to receive notifications. In some embodiments, to save storage space in the notification list, the notification service 134 may be configured to not store notifications received for recipients who are not registered. Further, in some embodiments, a notification may be removed from the notification list after its time to live has expired according to the time-to-live value included in the notification. Purging such expired (i.e., stale) notifications may save storage space.

Notification recipient module 122 of network device 116 may be configured to send a notifications request 128 to notification service 134, requesting notifications for recipient 117, e.g., any notifications for recipient 117 that have been posted since a last time a request for notifications was sent on behalf of recipient 117. For example, each notification in table 135 may include a time stamp, and the notification service 134 and/or the request 128 may indicate a last time at which a request was sent on behalf of recipient 117. Using this information, any notifications posted to notification table 135 for recipient 117 since a last time notifications were checked for the recipient (i.e., "new notifications") can be determined. Notifications requests may be sent periodically and/or in response to an instruction from recipient 117.

In response to receiving notifications request 128, notification service 134 may authenticate recipient 117, for example, by performing a handshake (e.g., in accordance with PKI). If recipient 117 is positively authenticated, then notification service 134 may return notifications in a notifications response 130 to notification recipient module 122.

In some embodiments of the invention, it is not assumed by recipient 117 and/or other recipients that notification service 134 is trusted. This lack of trust may be based on the possibility that notification service 134 could be configured to spy on a user's email traffic (e.g., learn which senders email a recipient) and/or generate spurious notifications. Spurious notifications may be considered a more serious problem than dropped notifications (which a malicious notification service can always cause) because spurious notifications impose a cognitive load on users while dropped notification leave users no worse off than then would be using known email systems. System 100 may be configured to protect against such attacks.

Accordingly, in some embodiments of the invention, to provide better security, notification service 134 may not be allowed access to user credentials necessary to authenticate recipients, and thus may not be the entity that performs the authentication of recipient 117 in response to receiving a notifications request 128. For example, notification service 134 may be configured to send a verification request 136 to another entity such as registration server 140 that has access to the credentials necessary to authenticate recipient 117. This other entity may respond to request 136 with a verification response 138 indicating a positive or negative authentication. Thus, in some embodiments, notification service 134 has no knowledge of the actual identity of the recipient who sent notifications request 128, which includes a suitably-obfuscated identity of the recipient, but has the ability to initiate the authentication of the recipient by another entity (e.g., registration server 140).

Although an embodiment including only a single registration server is described above, the invention is not so limited. It should be appreciated that, in some embodiments, multiple (e.g., two or more) registration servers may be provided, each of which may hold part of a recipient's registration information. Having multiple registration servers may prevent any one registration server masquerading (i.e., pretending to be) as a recipient, for example, if there is no PKI.

Notification recipient module 122 may be configured to compare the notification(s) included in response 130 (if any) to email messages received by email delivery system 118. For example, in embodiments where each notification includes a hash of an email message, module 122 may be configured to compare the hash to hashes of email messages received by email delivery module 118. The hashes of email messages received by module 118 may be determined in response to receiving response 130 and/or at an earlier time, for example: periodically; in response to an instruction from recipient 117; and/or for each email when it is received.

The notification recipient module 122 (or other component) may be configured to automatically determine whether an email message represented by a notification received in response 130 was lost or is simply delayed, for example, based on a time that has elapsed since the email was originally sent (e.g., several minutes, hours, days, etc.). The time at which the email was sent may be determined by a time stamp included in a notification representing the email message. Alternatively, the notification recipient module may be configured to let the recipient user decide whether an email message was lost or is simply delayed. Alternatively, an email message may be deemed lost regardless of the time elapsed since the email message was sent.

If the determination is made (automatically or by the user) that an email message is lost, then a non-receipt notice 114 may be transmitted to the sender, e.g., by notification recipient module 122 or email delivery module 118. Notification recipient module 122 or email delivery module 118 may be configured to automatically send non-receipt notice 114 or may be configured only to do so in response to an instruction from the recipient user. The non-receipt notice 114 also may include a request that the sender re-send the missing email message (e.g., email message 112). For example, if it is determined that an email message sent by email delivery module 104 was not received by email delivery module 118, then non-receipt notice 114 may be transmitted from network device 116 to email delivery module 104. In some embodiments, in addition to or as an alternative to sending a non-receipt notice 114 by email, an out-of-band notification may be transmitted to the sender (e.g., using other channels such as instant messaging (IM), phone, etc.).

System 100 and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 100 may reside on a single device (e.g., a computer), or one or more components may reside on separate, discrete devices. For example, the registration server 140 may be integrated with the notification service 134 or may be implemented as a separate and discrete component of system 100. Further, the registration server 140 and/or the notification service 134 may be integrated with an email server (not shown) of system 100 (e.g., as part of an email system) or may be implemented separately from any email server (e.g., as part of a separate and discrete notification system). Further, each component may be distributed across multiple devices, and one or more of the devices may be interconnected.

Further, on each of the one or more devices that include one or more components of system 100, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100, and components thereof, may be implemented using a computer system such as that described below in relation to FIGS. 4 and 5.

Figure 2:
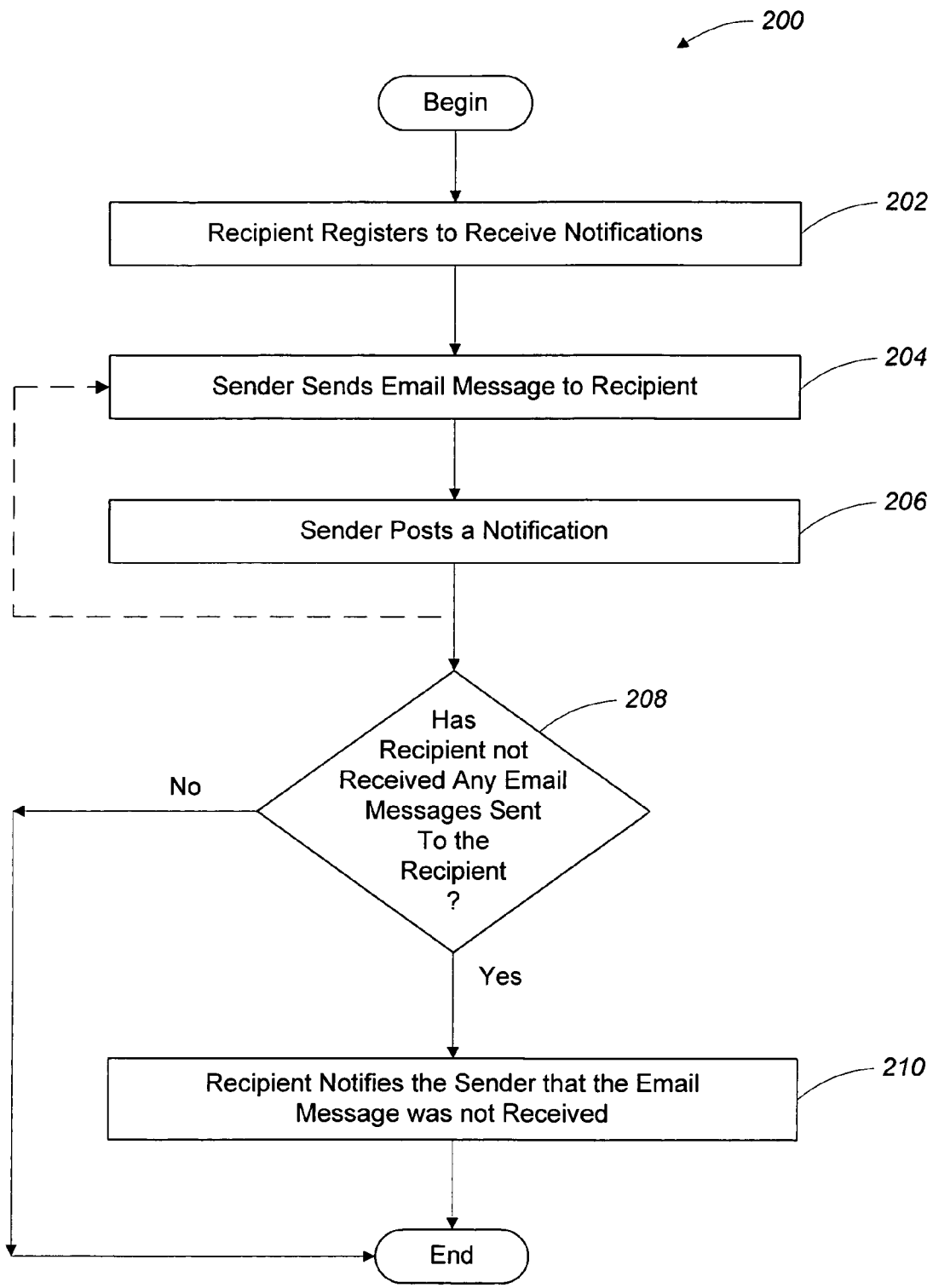
FIG. 2 is a flow chart illustrating an example of a method of using an email notification system, according to some embodiments of the invention.

FIG. 2 is a flow chart illustrating an example of a method 200 of using an email notification system according to some embodiments of the invention. Method 200 is merely an illustrative embodiment of a method of using an email notification system and is not intended to limit the scope of the invention. Other implementations of such a method, for example, variations of method 200 are possible and are intended to fall within the scope of the invention. It should be appreciated that an email not being received by the recipient means that an email application or portion thereof responsible for receiving email messages sent to the recipient, typically residing on the user device of the recipient, did not receive the email message.

In Act 202, a recipient may register to receive notifications, for example, as described above in relation to components 124 and 140 of system 100.

A sender may send an email message to the recipient in Act 204, and post a notification for the email message in Act 206, for example, as described above in relation to components 104, 110 and 134 of system 100. Acts 204 and 206 may be repeated for one or more email messages sent to the recipient from one or more senders.

In Act 208, it may be determined whether the recipient has not received one or more email messages sent to the recipient (e.g., since a last time such a determination was made). For example, Act 208 may be implemented by performing method 300, which will now be described in relation to FIG. 3.

Figure 3:
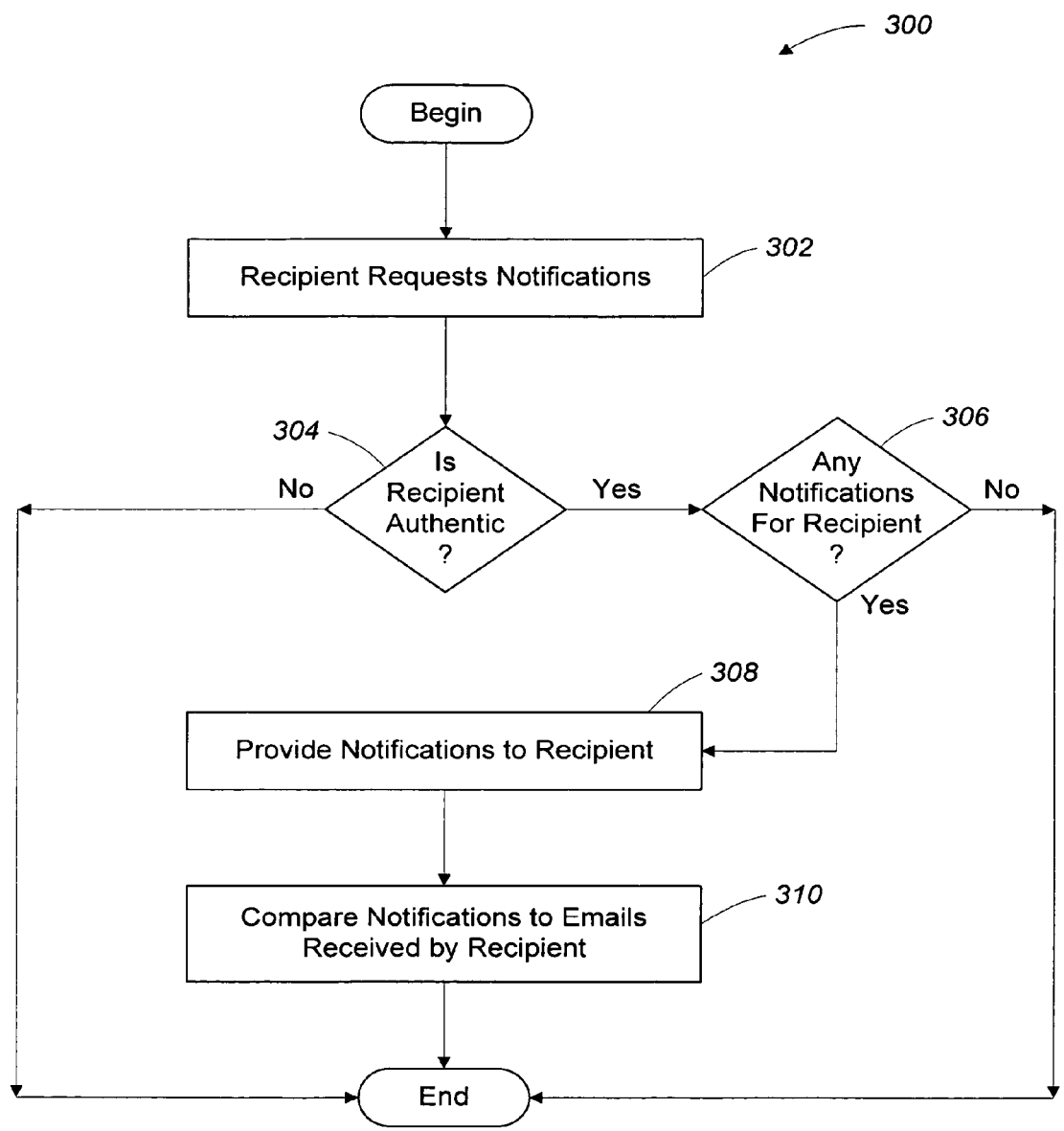
FIG. 3 is a flow chart illustration an example of a method of determining whether a recipient has not received one or more email messages sent to the recipient, according to some embodiments of the invention.

Digressing briefly from FIG. 2, FIG. 3 is a flow chart illustrating an example of a method 300 of determining whether a recipient has not received one or more email messages sent to the recipient, according to some embodiments of the invention. Method 300 is merely an illustrative embodiment of a method of determining whether a recipient has not received one or more email messages sent to the recipient, and is not intended to limit the scope of the invention. Other implementations of such a method, for example, variations of method 300 are possible and are intended to fall within the scope of the invention.

In Act 302, the recipient may request notifications, for example, as described above in relation to components 122 and 134 of system 100. It may be determined whether the recipient is authentic in Act 304, and if so, it may be determined whether one or more notifications for the recipient have been received in Act 306. Specifically, Act 306 may include determining whether any notifications for the recipient have been received since a last time notifications were checked for the recipient, e.g., as described above in relation to system 100. If one or more notifications have been received, then the notifications may be provided to the recipient in Act 308, for example, as described above in relation to system 100.

In Act 310, the provided notifications may be compared to email messages received by the recipient, for example, by an email delivery module of the recipient. Act 310 may be performed as described above in relation to component 122 of system 100.

Method 300 may include additional acts. Further, the order of the acts performed as part of method 300 is not limited to the order illustrated in FIG. 3, as the acts may be performed in other orders and/or one or more of the acts may be performed in parallel, at least partially.

Returning to FIG. 2, if it is determined that the recipient has not received at least one message sent to the recipient, then, in Act 210, the recipient may notify the sender of each email message not received that the message was not received, and may request that the sender re-send the message. This request may be sent by email message, for example, by an email delivery module (e.g., 118) or out-of-band, for example, by a notification recipient module (e.g., 122). In some embodiments, if multiple messages from a same sender have not been received, a single communication may be sent to the sender indicating that the multiple messages were not received.

Method 200 may include additional acts. Further, the order of the acts performed as part of method 200 is not limited to the order illustrated in FIG. 2, as the acts may be performed in other orders and/or one or more of the acts may be performed in parallel, at least partially.

Methods 200 and 300, and acts thereof, and various embodiments and variations of these methods and these acts, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., methods 200 or 300 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 400 and 500 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 4:
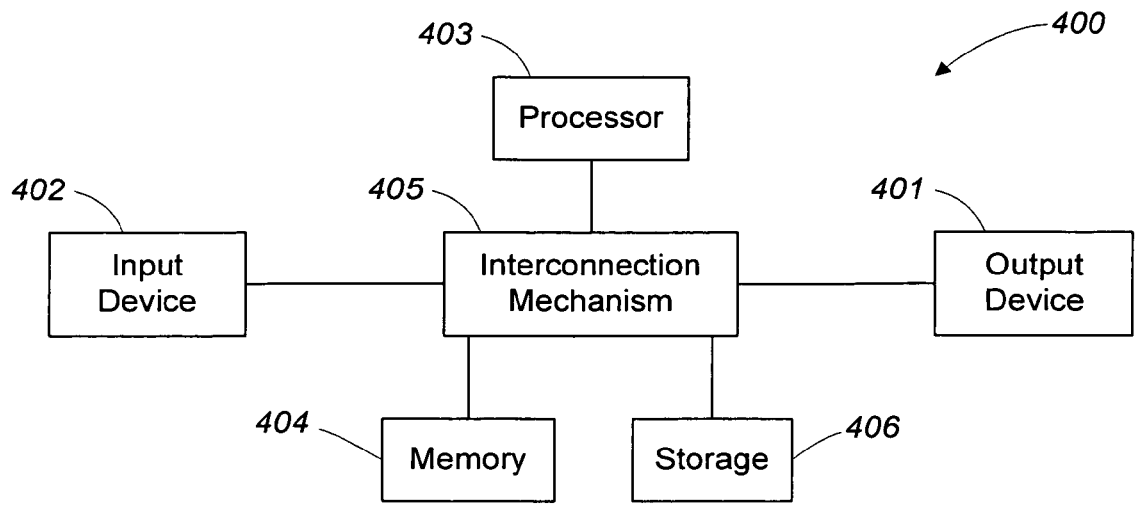
FIG. 4 is a block diagram illustrating an example of a computer system on which some embodiments of the invention may be implemented.
Figure 5:
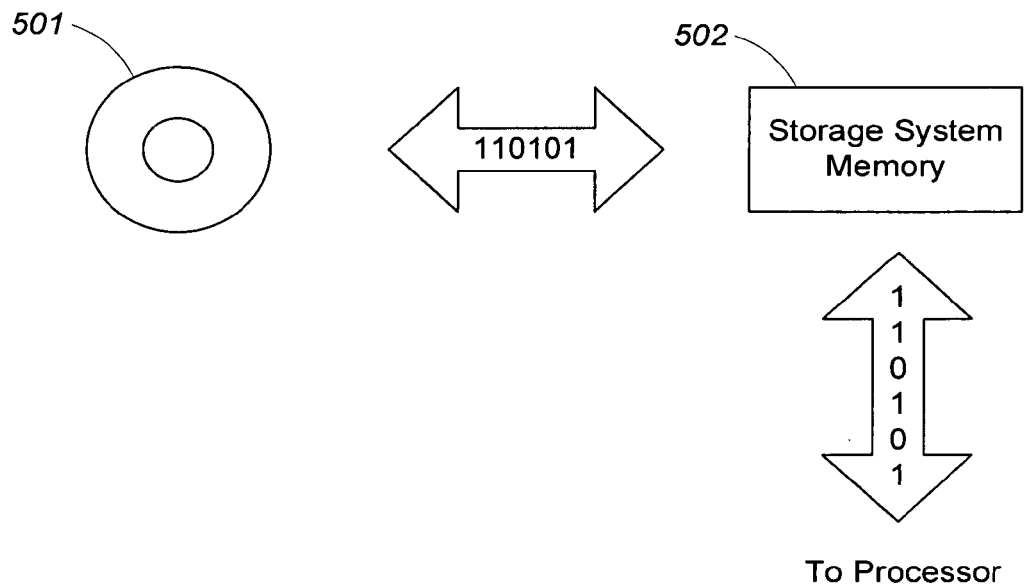
FIG. 5 is a block diagram illustrating an example of a storage system that may be used as part of the computer system to implement some embodiments of the invention.

It should be appreciated that any single component or collection of multiple components of a computer system, for example, any of the computer systems described in relation to FIGS. 1, 4 and 5, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

The following provides a description of several embodiments for implementing aspects of an email notification system, any of which may be implemented by system 100 and/or performed as part of methods 200 and 300. However, it should be appreciated that the foregoing examples are for illustrative purposes only and are not intended to limit the scope of the invention. Any of a variety of implementations, including variations of the following embodiments, are intended to fall with the scope of the invention.

1. Embodiments Assuming a PKI

In the following embodiment, a public-key infrastructure for email senders and recipients is assumed. The public-private key pair for a sender S is ($S_{pb}$,$S_{pv}$) and that for a recipient R is ($R_{pb}$,$R_{pv}$). Key operations are indicated as Sign (key, value) and Encrypt(key, value). Also assumed is a well-known one-way hash function H. All DHT operations are represented using the syntax func(keyID, ...), where keyID is the lookup key.

Upon system initialization, each participating email recipient, R, registers with the system by placing a request in the DHT: RegisterRecipient(H(R), (R, Sign($R_{pv}$,R))). The DHT node responsible for H(R) verifies the signature using the PKI and then records the fact that R is a registered recipient of the email notification system. From that point on, any node can post notifications of email messages sent to R. However, only R is in a position to present the credentials needed to read the notification information. Any notifications posted to an unregistered recipient email address will be discarded, thereby avoiding wasting storage resources on notifications intended for users who are not using the email notification system.

When S sends an email E to R, it constructs a notification N=(H(E),T,Encrypt($R_{pb}$,S),Sign($S_{pv}$,H(E),T)))) (where T is the time-to-live (TTL) of the notification) and places a request in the DHT: PostNotification(H(R),N). The DHT node H(R) appends N to the list of notifications for R. It may delete N from the list after the TTL has expired. Since the DHT only provides best-effort service, a sender who is particularly anxious about registering the notification for an (important) email could re-post the notification at a later time. For such re-postings, the DHT node, H(R), either records the notification (if it was missed the first time) or ignores the repeat posting (since H(E) would identify it as a duplicate).

Periodically, the email client at R queries the DHT: CheckNotification(H(R)). The DHT node H(R) performs a standard handshake to authenticate R and then returns to it the list of notifications. Although the notifications are encrypted, authentication may be desirable to prevent an attacker from gleaning information about the volume of email messages to R from the volume of notification information returned. An alternative strategy would be for R to "pad" its notification list with bogus notifications intended to confuse an attacker. The recipient's email client validates the notifications by checking their signatures and then checks the hashes contained in the notifications against hashes of received email messages (which can be pre-computed), to determine the ones that may correspond to missing email messages. The recipient user is then notified of such notifications, each of which is annotated with the sender's email address. At this point, the user can take corrective action, which could include requesting the sender to resend the missing message identified by H(E). Such a request could be made via email or out-of-band, and with or without human involvement.

Since the notification system is separate from the email delivery system, the operation of the latter is unaffected by the former. So email performance using the notification system is no worse than with the current email system. Also, the work of carrying the message bits is not duplicated, thus limiting the overhead. Nevertheless, there is the overhead of the DHT operations to post and check notifications, an issue we discuss below in more detail.

The asynchronous operation of email is preserved since the posting of notifications by senders is decoupled from the checking of notifications by recipients. Senders do not know whether or when recipients are checking for notifications.

The availability of a PKI facilitates preserving the privacy of notifications and filtering out bogus notifications. Thus, the recipient user is notified only when there is missing email and incurs no additional work otherwise. However, the DHT node H(R) is in a position to monitor the volume of notifications posted for recipient R even if the content of the notification and the sender identity are obscured. We discuss possible mitigations of this potential problem below.

Finally, since the actual email content is transferred via SMTP, it is subject to checks by the spam and virus defenses already in place.

While the above embodiment provides several desirous properties, the dependence on a PKI may present an impediment to adoption for some email users. The following embodiments avoid dependence on a PKI. Also described are ways to reduce the volume of DHT operations and to support mailing lists.

2. Embodiments Avoiding Dependence on a PKI 2.1. Non-infrastructure Based Key Exchange:

Without a public key infrastructure, a scheme such as PGP (pretty good privacy) or GnuPG may be employed. A properly configured client module (e.g., on a user device) for R generates $R_{pb}$ and $R_{pv}$, and S generates $S_{pb}$ and $S_{pv}$. To distribute $S_{pb}$, S's client attaches $S_{pb}$ to the first outgoing email to R, and R does likewise. S and R will have to trust the public keys contained in their first email exchange.

On system initialization, R places a request in the DHT: RegisterRecipient(H(R), (R, $R_{pb}$)). To prevent someone else from masquerading as R and registering on its behalf, DHT node H(R) initiates a simple handshake via email, whereby it confirms that the node purporting to be R can in fact receive email sent to R and decrypt nonces encrypted with $R_{pb}$. This handshake also helps defend against replay attacks. Once the handshake has completed successfully, the DHT node H(R) stores a record H(R)→$R_{pb}$. S posts notifications and R checks for them in the same manner as before.

A problem case for this non-infrastructure based key exchange is when a user S migrates from one (properly configured) client to another, for example, when S switches to a new computer or a disk crash requires S to setup a new email client. Since there is no PKI that stores $S_{pb}$ and $S_{pv}$, S needs to somehow obtain these for the new client.

There are two possible (but not necessarily satisfactory) solutions. First, the user could be required to backup $S_{pb}$ and $S_{pv}$, and restore them on new clients. This is unsatisfactory because it requires user involvement. Second, a scheme for migrating keys could be used. For example, if at any time S changes its keys, it attaches the new $S_{pb}$ to its next email to R (or on all email messages). R will see the new $S_{pb}$ and migrate to using it instead. A new handshake can also be performed with the DHT node. Unfortunately, this scheme has two drawbacks. First, it requires modification of email messages to include the public key. Second, it is vulnerable to an attack where a malicious node T forges email to R as though it were from S, with a bad key, $T_{pb}$, attached. In this way, T can pollute R's state, invalidating subsequent notifications by S.

2.2. Embodiments Using a Reply-based Shared Secret:

To avoid these problems, a technique for generating shared secrets between S and R that is both automatable (i.e., does not require direct human involvement) and supports migration may be employed. The email-based handshake procedure described above is used for registration.

Email often involves one user "replying to" a prior email message from the other user. There are multiple known ways to detect whether an email is a reply to a previous one. For example, the resulting message often has remnants of the original message (in the subject line, quoted text, in-reply-to header, etc.). The in-reply-to filed can be used in situations in which the message ID of the original message is available to the party sending the reply message (which may not be the case, e.g., if a message ID of the original email is inserted by an email server and hence is not readily available to the sending client). For example, in some email systems (for example, in the case of Microsoft Outlook mail user agents (MUA) and Microsoft Exchange mail transfer agents (MTA)), the Message-ID is inserted by the MTA and hence is unknown to the MUA sending the email. Even if inserted by the sending MUA, the Message-ID may be modified by the MTA. Hence, we cannot solely rely on the Message-ID and In-Reply-To fields for reply detection.

Thus, it may be determined that an email message is a reply to an earlier one using other techniques such as, for example, text similarity techniques. For example, an alternate reply detection algorithm may be used that does not use the Message-ID and In-Reply-To fields. An email A may be marked as the reply of an email B if: (i) the subjects of A and B are identical after removing any prefixes found in the subjects such as, for example, "Re:", "re" or another form of prefix, and (ii) the bodies of A and B pass the k-grams text similarity test. In the k-grams test, we calculate the number of common subsequences of k words (k-grams) in the bodies of emails A and B. If the number of common k-grams is greater than a threshold (M), the two emails pass the test. The k-grams of an email constitute its signature and are stored for performing reply detection tests on incoming email. In order to reduce storage space, 4-byte hashes of the k-grams may be stored, instead of the full k-grams.

Using one of these reply detection techniques, it should often be possible to determine with a low false positive rate whether an email $E_2$ from R to S is a reply to an earlier email $E_1$ from S to R. When S receives $E_2$ and determines that it is a response to the earlier message $E_1$, S can conclude that $E_1$ (or $H(E_1)$, for compactness) is a shared secret between itself and the recipient R. Since this state is not known to any other node, S can use $H(E_1)$ to identify itself to R (to be safe, S should use as $E_1$ an email message whose only recipient was R). Similarly, if S replies to $E_2$ with $E_3$, then R can subsequently use $H(E_2)$ to identify itself to S.

In this scheme, the notification for a new message, $M_{new}$ from S to R may be constructed as follows: $N=[T, H(M_{new}), H(M_1), MAC([T, H(M_{new})], H'(M_1))]$. T is the time-to-live for the notification. $H(M_{new})$ (the bodyHash) is the hash of the contents of the new message for which the notification is being constructed. $H(M_1)$ (the shared secret identifier (ssId)) implicitly identifies S to R and R alone. Basically, R can look up $H(M_1)$ in its cache and verify that it corresponds to a shared secret that it had established with S, and thus identify S. Finally, $MAC([T, H(M_{new})], H'(M_1))$ (the authenticator) proves to R that this is a genuine notification generated by S. Only S and R are in a position to (pre)compute the key $H'(M_1)$ used in the MAC. Possession of $H(M_1)$ alone, say from a prior notification, does not permit an attacker (e.g., the DHT node $H(R)$) to compute $H'(M_1)$ and hence post a fake notification.

For a first-time sender who has not established a shared secret with R, there are two choices—either post an unencrypted notification to the DHT, thereby revealing his/her identity to the DHT, or not post a notification at all in the hope that email loss does not occur. When R receives this notification, it may place this notification in the "Junk notifications" category, according it lower priority than notifications from "trusted" senders (i.e., senders from whom R has received email messages and to whom it has sent email messages in the past).

In fact, it is fundamentally hard to distinguish between a spammer and a first-time, legitimate Sender S. Note, however, that this would be a problem only in the event that the first email from a sender to R is lost, which should be rare. A solution to these first-time sender problems according to some embodiments of the invention, is described below in more detail.

In terms of state, R needs to remember two hashes for each email address with which it corresponds, one for sending and one for receiving. For better security, and to handle the case of migrating a user to a new installation of an email application, $E_1$ and $E_2$ can always be refreshed to the last pair of email messages exchanged between R and S, as follows. S remembers the hashes of all messages sent by it since the most recent one replied to by R. Likewise, R remembers the hashes of all email messages from S (to which it had replied) since the most recent email that S has used as shared secret in a notification. Thus, a user who migrates to a new client can automatically establish a new shared secret with a peer based on fresh email exchanges. This shared secret is then used to authenticate fresh notifications. The only window of vulnerability is the time between when the user migrates and when a new shared secret is established. The user may not be in a position to authenticate notifications posted during this window or post any authentic notifications itself.

Because establishing a shared secret between a sender and a recipient requires an email from the former to be replied to by the latter, an attacker is prevented from polluting this state. A bogus "reply" generated by the attacker will be rejected since the sender would have no record of having sent the original email to which the attacker's email purports to reply.

The reply-based shared secret scheme has the advantage that it leaves the email messages themselves untouched. However, it is susceptible to eavesdropping. An attacker who is able to listen in on email communication to/from a user can learn the reply-based shared secrets of the user, and so would be in a position to post bogus notifications purporting to be from s menders that the user trusts. Such an attacker would also compromise the user's privacy, which is arguably a greater threat.

Compared to the PKI embodiments described above, the assurances provided with reply-based shared secret embodiments are somewhat weaker but still quite good. These assurances depend on: (a) the inability of an attacker to eavesdrop on or intercept the registration or authentication messages exchanged with a recipient, to prevent the process from being hijacked; (b) the secrecy of email messages exchanged between two users; and (c) the ability to detect email replies to set up the shared secret. All of these assumptions are reasonable in practice. If (a) or (b) were not to hold, then the privacy of email would be compromised anyway, regardless of whether there is a notification system. Regarding (c), note that it may be acceptable to avoid false positives, but tolerate false negatives so long as at least some replies are detected to allow the shared secret to be updated.

2.2.1. Embodiments Addressing First-Time Sender Problem 2.2.1.1. Problem Outline Although at first glance it might seem that a legitimate first-time sender (FTS for short) is indistinguishable from a spammer, in practice there are social links that may set apart a legitimate FTS from a spammer. Although the FTS may never have communicated with the intended recipient, he/she may have communicated with an intermediary who may have in turn communicated with the recipient. For example, such an intermediary may be a colleague of the recipient at the same institution. The intermediary is thus in a position to "introduce" the FTS to the recipient.

Consider an FTS, F, who is trying to communicate with R. Also, assume that there is an intermediary I with whom both F and R have communicated in the past. The goal is to enable F to post a notification for an email it sends R such that R does not discard the notification as spam. Although it is desirable to leverage the relationship that F and R both have with I, it is also desirable to prevent any resulting adverse impact on privacy. Embodiments of the invention implement solutions that have one or more of the following desirable properties: (a) prevent I from learning that F intends to communicate with R; (b) prevent F from learning that I and R have previously communicated; (c) prevent R from learning that F and I have previously communicated; (d) prevent some fourth party X which has no relationship with I nor R from masquerading as someone with a relationship with I; and (c') (in the event that (c) cannot be satisfied) prevent R from learning about any of F's correspondents other than those it shares in common with F. Property (c') may be considered a diluted form of property (c).

Described below are embodiments of the invention involving a "heavy-weight" solution and a "light-weight" solution, each of which provides the above list of desired properties to varying degrees.

2.2.1.2. Heavy-Weight Introduction Mechanism Embodiments

By virtue of its past communication with R, I possesses a shared secret $S_{IR}$ with R as described above, I uses $S_{IR}$ to authenticate notifications it posts for R. With the introduction mechanism, I passes on a diluted version of the shared secret to each of its correspondents, including F. Dilution may be accomplished by computing a one-way hash of the shared secret so that the diluted version of the shared secret between I and R is $D_{IR}=H(S_{IR})$. F uses $D_{IR}$ to authenticate itself when posting a notification for R. By looking through its cache of shared secrets with its correspondents and hashes of these shared secrets, R can recognize the notification as having been posted by someone who is in possession of the hash of a legitimate shared secret.

If I shares (in a diluted form) the shared secrets it has set up with each of its correspondents (including R) proactively with all of its correspondents (including F), then property (a) is satisfied, i.e., I does not learn that F intends to communicate with R. However, properties (b) and (c) are not satisfied. Property (b) can be partially satisfied by having I obscure the identity of its correspondents (e.g., R) with a one-way hash when sharing the diluted shared secret information. Using this technique, F can learn the identity of I's correspondents (e.g., R) only if F happens to explicitly test the one-way hash with the corresponding identities. Property (c) can also be partially satisfied by employing a Crowds-style multi-hop routing scheme, where the diluted shared secret from the source node is passed through a random chain of mutually trusting correspondents. Using this technique, although R can discern that F is in possession of $D_{IR}$, it cannot conclude that I and F are correspondents.

Property (d) is also not satisfied if F can pass on the information it received from I to X, and then R has no way of knowing that X and I have in fact not communicated before. To satisfy this property, I can distribute $D_{IR}=H(S_{IR}, F)$ to F. When R receives a notification, it computes hashes with the claimed sender address for all its shared secrets. If it does not match, it ignores the notification. F can still distribute $D_{IR}$ to X and X can lie and claim to have posted a notification from F, but X gains nothing as the lost email request will go to F, not X.

Sharing the shared secrets proactively may incur a significant overhead. For example, a node such as I may have separate shared secrets with each of its correspondents, and these need to be shared individually with each correspondent. I may post this information into a DHT, individually encrypted using the secret it shares with each of its correspondents. Thus, if I has n correspondents, it would have to post $n^2$ messages to the DHT, each message being O(n) in size, incurring a total overhead of $O(n^2)$. In some embodiments, a lightweight introduction mechanism may be used that mitigates the overhead resulting from use of the heavy-weight introduction mechanism, while still satisfying one or more of the desired properties described above, albeit in a different manner.

2.2.1.3. Light-Weight Introduction Mechanism Embodiments

In light-weight embodiments, each node such as I establishes a common shared secret with all of its correspondents. Thus, all correspondents of I share a common secret, $S_I$. One correspondent, for example, F, can use $S_I$ to authenticate notifications it may post for another correspondent, say R, even if F is a first time sender with respect to R.

The use of a common shared secret means that I does not have to send the list of its correspondents to each of its correspondents. Of course, if F finds that it shares $S_I$ with R (among others), it can deduce that I and R have been in communication. However, the only way for F to learn that I and R have been in communication is for a notification posted by F for R, and authenticated using $S_I$, to be honored by R. This light-weight mechanism does not expose I any more than known email systems that do not employ a notification system, in which F and R simply exchange information on whether they have both communicated with I.

A more-specific example of a light-weight introduction mechanism will now be described. Each node (e.g., I) establishes a common secret, $S_I$, with all of its correspondents. Whenever I exchanges email with a new correspondent C and establishes a pairwise reply-based shared secret ($S_{IC}$) with it, I also conveys $S_I$ to C. I does so by posting this information, encrypted with the pairwise shared secret $S_{IC}$, to a DHT node H(C). Thus, all correspondents of I share a common secret, $S_I$. One correspondent, say F, can use $S_I$ to authenticate notifications it may post for another correspondent, say R, even if F is a first-time sender with respect to R.

A notification from an FTS, F, for an email M that it has sent to R takes the form N=[T, F, H(M), H($S_I$), MAC([T, S, H(M)], H'($S_I$))] (see definitions of terms above). As with non-FTS notifications, this construction prevents an attacker who is in possession of N from learning the secret $S_I$ or constructing fake notifications. The main difference compared to the non-FTS construction is that the identity of F needs to be included explicitly, either in the clear as shown above or encrypted with the secret, $S_I$.

A key question is how F knows to use $S_I$ rather than a secret $S_{I'}$ obtained from another correspondent (and potential intermediary), I'. Clearly, satisfying property (b) requires that F not know whether a particular intermediary, such as I, has been a correspondent of R. It is appropriate to rely on human input, since the FTS scenario occurs relatively infrequently. When the notification system at F detects that it is an FTS with respect to the intended recipient R, it alerts the user and asks for a recommendation of one or more intermediaries from among F's correspondents. The human user can often make an informed choice, for example, by picking a colleague of the intended recipient, R, as the intermediary. The notification system can aid the process by automatically listing correspondents who are in the same email domain as R and hence are likely to be suitable intermediaries.

In the extreme case, F can include shared secrets obtained from all of its correspondents in the notification. R can determine if any are in common with the set of shared secrets it has obtained from its correspondents. If so, it deems the introduction as valid and honors the notification. Given that the shared secrets are opaque quantities, R does not learn anything from the shared secrets that originated from correspondents of F that are not common to R. Thus property (c') is satisfied. Note that including shared secrets from all correspondents generates notification traffic volume that is proportional to the number of correspondents.

2.2.2 Leakage of Shared Secret

What happens if a correspondent of I such as F passes on the secret $S_I$ to spammers? In general, shared secrets in the notification system are set up and shared only with "trusted" peers, where trust is established based on email exchange. There is always an element of risk that a peer may not be worthy of this trust. The introduction mechanism carries the added risk that the identity of the untrustworthy peer may not be readily apparent (since all such peers hold the same secret, $S_I$).

First, the damage done by accidental leakage can be limited by updating the shared secret periodically. Second, a recipient such as R can accord lower priority to notifications authenticated using a common shared secret such as $S_I$ compared to those authenticated using a pairwise shared secret such as $S_{IR}$. Third, if property (c) is not satisfied, R can at least identify I or one of its correspondents as the source of the leak. If this is a frequent occurrence, the user R could be alerted to reconsider its trust of I. So in practice, property (c'), which provides a weaker assurance of privacy, may be more desirable than (c).

3. Embodiments Reducing Notification Overhead

Since the commonly employed SMTP-based email infrastructure works fine most of the time, posting a notification for every email sent could add up to significant and unnecessary overhead. To reduce overhead, a sender could hold off on posting a notification for a while, in the hope that an "ACK" in the form of a reply or a "NACK" in the form of a bounce-back (both detected automatically, without human involvement) would obviate the need for the notification. Notifications for multiple messages to a recipient could also be coalesced to reduce overhead. Finally, a sender or his/her email client could chose to post notifications only for a small subset of messages that are deemed important enough to be protected using an email notification system. For example, the subset might include only email messages sent to particular recipients, ones with the "Importance: high" flag set, etc. As a data point, a recent study determined that, from a sample of 57,972 email messages drawn from half-dozen employees of a large company, only 2.3% had the "Importance: high" flag set.

Another option is for the sender to include hashes of previously sent email messages in new email messages. This procedure can possibly help detect email loss quickly, obviating the need for a notification to be posted to the notification list (e.g., a DHT), but at the cost of modifying email messages. Such loss detection may work only when there is sporadic loss in an otherwise steady stream of email messages.

4. Supporting Mailing Lists

Notifications are posted as usual for email messages sent to mailing lists. However, the options described above involving holding back on notifications may not apply. The notification for an email sent to mailing list M could be sent to H(M). Individual recipients could be responsible to periodically query the notification list (e.g., through the notification service) for notifications of email messages sent to mailing lists of which they are members.

5. Possible Attacks

Despite the steps taken in embodiments of the above email notification systems to protect the privacy of both senders and recipients, an attacker could try indirect means to glean information. For instance, a (trusted) sender could post spurious notifications with carefully controlled time-to-live values (TTLs) and then infer a recipient's email checking (or at least notification checking) habits based on which email messages, if any, for which the recipient asks for a retransmission. However, a recipient could watch out for and choose to ignore suspicious patterns of notifications (e.g., frequent notifications from a sender indicating apparent email loss).

A DHT node (or other type of notification service) could use knowledge of the IP addresses from which notifications are being posted for each recipient to reverse-engineer some information about the senders. This threat could be alleviated by passing the notification through a forwarding chain (as in standard DHT routing or in anonymous communication systems instead of directly sending it to the H(R) node.

Since the DHT node, H(R), authenticates the request for notifications from R (whether using a PKI or an email-based handshake), it is in a position to monitor the volume of notifications intended for R, even if it cannot tell the identity of the senders. To alleviate this problem, R could register with a different DHT node as a function of time (say node H(R, d), where d is the current date/hour), thereby denying any single DHT node the opportunity to monitor its notifications on a continuous basis. Alternatively, registration/authentication could be decoupled from the posting of notifications. While notifications are posted to node H(R) as before, R registers itself with node H(H(R)), which allows another node (say H(R)) to authenticate R without learning its identity. We assume that only a small fraction of the nodes in the DHT is malicious and/or in collusion.

6. Embodiments Using Email Messages as Notifications

In some embodiments, entire email messages (e.g., a copy of the email message for which the notification is being sent or an email including copies of previously sent emails) may be used as notifications, rather than only portions of email messages or information derived therefrom (e.g., hashes). However, using email messages as notifications is problematic for several reasons. First, email messages are larger than other forms of notifications described above (e.g., those that include hashes), so transporting them incurs a much larger overhead. Second, it still may be desirable for email messages to be routed through spam filters, virus scanners, etc., which leaves open the possibility of losing email messages being used as notifications. In contrast, other forms of notifications (e.g., other forms described herein) may be fixed-sized, fixed-format entities that do not pose the same threat as malicious email content and hence need not be filtered the same way. Finally, as noted above, using email messages as notifications is potentially disruptive and runs the risk of under-performing the current email system.

7. Embodiments Integrating an Email Notification System with an Email Infrastructure As noted above, in some embodiments of the invention, a notification system may be integrated as part of an email system. For example, notification mechanisms could be integrated directly into an existing email infrastructure, for example, by having the receiving email server or spam filter generate notifications locally for email messages that are dropped.

There are several reasons why such integration could be problematic, such that having the notification system operate separately would be advantageous. First, since the email server by itself cannot distinguish dropped email messages originated by senders that the recipient trusts from other email (e.g., spam), the server is forced to generate notifications (including computing a hash of the message content) for all dropped email messages. This can place a significant burden on the email server, with potentially negative impact on normal email delivery. Second, even if load were not an issue, a recipient's email server cannot by itself generate notifications that allow the recipient to distinguish between dropped email messages from trusted senders from other dropped email messages, resulting in a burden on the user to sort through them. Avoiding this problem would require support at the sender end, as in some embodiments described above. Third, often spam is dropped without even looking at the email content, e.g., by blacklisting certain IP addresses. According to the IT staff of a major corporation, over 98% of dropped email messages are estimated to be due to such steps. It is impossible for the email server to generate meaningful notifications in such cases. Finally, to the extent that email loss happens not because of a conscious decision to drop email but due to failure, it would be hard for the (failed) infrastructure to generate meaningful notifications.

Thus, keeping the notification system separate from the email delivery infrastructure is advantageous because it avoids burdening the email delivery infrastructure and is less prone to correlated failures of both the email delivery and notification systems. Further, placing the burden of ensuring reliable email delivery on the senders and recipients themselves rather than the email delivery infrastructure is in conformity with the end-to-end principle that underlies the Internet's design.

8. Embodiments Involving Modifying Emails

As discussed above, the email notification system may be designed to avoid modifying emails so as not to alter the behavior of email delivery (e.g., the likelihood of an email being classified as spam) in any way and to allow users to use any email client unaltered. In some embodiments, emails may be modified. For example, user-defined email headers may be permitted to be inserted by customized clients, which may prove advantageous. First, the sending client could explicitly insert the message ID or an equivalent user-defined field to obviate the need for content-based reply detection (described above). Second, a notification could include the (unique) message ID instead of a hash of the message contents. Further, the sending client could insert notifications of recently sent emails in subsequent emails, thus enabling the recipient to determine if it is missing any of those emails. However, loss detection based on such in-band notifications may work only when there is sporadic loss in an otherwise steady stream of emails. Also, in-band notifications run the risk of being lost because of email spam filtering. Thus, an out-of-band mechanism for posting notifications still may be needed as a fallback.

9. Implementation Examples

In some embodiments of the invention, a notification system (e.g., system 100 or components thereof) may be implemented using C++, for example, in approximately 4000 lines of C++ code. The notification system may consist of two components, an email notification server and an email notification client. The notification server may expose a put/get interface and run on a single remote machine, which may implement notification service 134 and/or registration server 140.

The notification client may run on a user's computer (e.g., network device 102 and/or 116), and may snoop on incoming and outgoing emails without requiring any modifications to the user's email client software or the email delivery infrastructure. The notification client may implement a notification recipient module (e.g., 106,122), a notification sender module (e.g., 110, 120) and/or a notification registration module (e.g., 108,124) described above in relation to FIG. 1. In an embodiment, the email system may be implemented using Microsoft® Outlook®, and emails may be snooped by registering extended MAPI callbacks with the email servers. For email systems (like UNIX mail) which store emails in text/mbox files, the files may be continuously monitored for new emails.

The messages exchanged between a notification server and a notification client may be configured in XML format. For example, a sender may post a notification (e.g., notification 126) using the following sample post notification message:

```
<Sure MailMsg
    type = "post_not"
    toAddrHash  = "1261 delab4532dd06851ac3ed237t809dcaa0126"
    ttl         = "43200s"
    bodyHash    = "56893db1oa38600dbaeofl23765096ad96ef9ddd"
    ssid        = "89d03cca4dba4791aberl498d876ca0023abcefd1"
    auth        = "ab11211189defaU45c69268daaae91x32a1223a"
/>
```

The bodyHash, shared secret identifier (ssid), authenticator (auth) and ttl fields represent $H(M_{new})$, $H(Mold)$, $MAC[T,H(M_{new})]$, $H'(Mold)$) and T of the notification, as defined above. $H(M_{new})$ and $H(M_{old})$ may be 20-byte SHA1 hashes. M A C ([T, $H(M_{new})$], $H'(M_{old})$) may be a 20-byte HMAC-SHA1 hash. T may be 4 bytes long. Thus, the total notification size may be 64 bytes. An OpenSSL library may be used for all cryptographic and hash operations. The total size of the notification message, including the overheads for the verbose XML text and the hash of the recipient email address my be 166 bytes. Although a binary message format may be used to reduce the message size to 85 bytes, the larger XML messages may be used to exploit the flexibility provided by XML.

Despite the effectiveness of a centralized implementation of a notification server, a system for use by large numbers of users, say the entire Internet, may warrant a more scalable solution. An implementation on top of a DHT can allow the system to scale more easily. Prior work has demonstrated get( ) latencies of under 200 ms on average, and under 2 s for the 99th percentile for the OpenDHT system running on Planet-Lab.

It may be difficult to implement a notification server on top of a DHT. Because the a notification server may expose a put/get interface, any existing DHT algorithm can be plugged in with little effort. For example, a Chord DHT implementation may be implemented using only 60 lines of C++. The a notification client may use a nearby notification server as a first hop gateway to post and retrieve notifications from a notification overlay. This first hop notification server may forward the client post/retrieve request to the notification server responsible for storing the notification using the Chord DHT protocol. The response to the request may be sent back to the client via the first hop notification server.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 400 such as that shown in FIG. 4. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405).

The storage system 506, shown in greater detail in FIG. 5, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system shown in FIG. 4. Various aspects of the invention may be practiced on one or more computers having a different architecture or components that that shown in FIG. 4.

Computer system 400 may be a general-purpose computer system that is programmable using a high-level computer programming language. Computer system 400 also may be implemented using specially-programmed, special-purpose hardware. In computer system 400, processor 403 is typically a commercially available processor such as the well-known Pentium class processor available from the Intel Corporation. Many other processors are available. Such a processor usually executes an operating system which may be, for example, the Windows® 95, Windows® 95, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of ascertaining whether an electronic mail application has not received an electronic mail message, the method comprising acts of:
    sending, to a notification service, a request to receive electronic mail notifications, the request sent by a user device of a recipient user that is an intended recipient of the electronic mail message, each electronic mail notification being separate from a corresponding electronic mail message and indicating that the corresponding electronic mail message has been sent to the recipient user;
    receiving, by the user device of the recipient user, at least one notification retrieved from a notification list of the notification service, the at least one notification indicating that a first electronic mail message has been sent to the recipient user;
    determining, by the user device of the recipient user, whether the first electronic mail message indicated by the at least one notification has not been received by the electronic mail application of the user device of the recipient user by comparing the at least one notification to an email list of electronic mail messages received by the user device of the recipient user, thereby determining failed delivery of the first electronic mail message;
    determining, by the user device of the recipient user, an elapsed time since the first electronic mail message was sent, based on a time stamp included in the at least one notification, the elapsed time being indicative of whether the first electronic mail message was lost or was delayed; and
    in response to the user device of the recipient user determining that the first electronic mail message was not received, the user device of the recipient user notifying a sender of the first electronic mail message that the first electronic mail message was not received.

2. The method of claim 1, wherein the notification list resides on a network device separate from the user device.

3. The method of claim 1, wherein the notification list comprises a hash table including the at least one notification, and wherein the at least one notification comprises a hash indicative of the first electronic mail message.

4. The method of claim 1, wherein the notification list comprises a hash table including the at least one notification, the at least one notification comprising a first hash indicative of the first electronic mail message, and wherein the act of determining whether the first electronic mail message has not been received further comprises:
    comparing the first hash to a hash of each electronic mail message listed in the email list until a match is found or an end of the list is reached.

5. The method of claim 1, further comprising:
    sending, by the user device of the recipient user, user credentials to authenticate the recipient user.

6. The method of claim 1, further comprising an act of:
    registering the recipient user with a registration service to receive electronic mail notifications.

7. A computer-readable storage device encoded with computer-executable instructions that, when executed by at least one processor, perform a method of ascertaining whether an electronic mail application has not received an electronic mail message, the method comprising acts of:
    sending, to a notification service, a request to receive electronic mail notifications, the request sent by a user device of a recipient user that is an intended recipient of the electronic mail message, each electronic mail notification being separate from a corresponding electronic mail message and indicating that the corresponding electronic mail message has been sent to the recipient user;
    receiving at least one notification retrieved from a notification list of the notification service, the at least one notification indicating that a first electronic mail message has been sent to the recipient user;
    determining whether the first electronic mail message indicated by the at least one notification has not been received by the electronic mail application of the user device of the recipient user by comparing the at least one notification to an email list of electronic mail messages received by the user device of the recipient user, thereby determining failed delivery of the first electronic mail message;
    determining, by the user device of the recipient user, an elapsed time since the first electronic mail message was sent, based on a time stamp included in the at least one notification, the elapsed time being indicative of whether the first electronic mail message was lost or was delayed; and in response to the user device of the recipient user determining that the first electronic mail message was not received, the user device of the recipient user notifying a sender of the first electronic mail message that the first electronic mail message was not received.

8. The computer-readable storage device of claim 7, wherein the notification list resides on a network device separate from the user device.

9. The computer-readable storage device of claim 7, wherein the notification list comprises a hash table including the at least one notification, and wherein the at least one notification comprises a hash indicative of the first electronic mail message.

10. A system for controlling access to a notification list including a plurality of notifications for a plurality of users, each notification indicative of an electronic mail message sent to a particular user, the system comprising:

at least one processor programmed to:

receive a request for notifications, the request sent by a user device of a recipient user that is an intended recipient of the electronic mail message, each electronic mail notification being separate from a corresponding electronic mail message and indicating that the corresponding electronic mail message has been sent to the recipient user;

in response to receiving the request, determine one or more notifications in the notification list that correspond to the recipient user; and in response to determining one or more notifications in the notification list that correspond to the recipient user, send the one or more notifications to the user device of the recipient user to enable the user device to determine failed delivery of the electronic mail message by comparing the one or more notifications to an email list of electronic mail messages received by the user device of the recipient user, to determine an elapsed time since the electronic mail message was sent, based on a time stamp included in each of the one or more notifications, the elapsed time being indicative of whether the electronic mail message was lost or was delayed, and, in response to the user device of the recipient user determining that the electronic mail message was not received, to notify a sender of the electronic mail message that the electronic mail message was not received.

11. The system of claim 10, wherein:

the notification list comprises a hash table including the one or more notifications;

the one or more notifications comprise a hash indicative of a first electronic mail message sent to the recipient user; and the at least one processor is further programmed to access the hash table.

12. The system of claim 10, wherein the request for notifications includes user credentials, and wherein, upon receiving the request for notifications, the at least one processor is further programmed to initiate an authentication of the recipient user using the user credentials.

13. The system of claim 12, wherein the at least one processor is further programmed to initiate the authentication by sending a verification request to a registration server to verify an identity of the recipient user.

14. The system of claim 10, wherein the at least one processor is further programmed to:

receive at least one notification from an originating sender of an electronic mail message indicating that the electronic mail message has been sent to the recipient user; and store the at least one notification in the notification list.

* * * * *